United States Patent [19]
Nishiyama

[11] Patent Number: 6,148,439
[45] Date of Patent: Nov. 14, 2000

[54] NESTED LOOP DATA PREFETCHING USING INNER LOOP SPLITTING AND NEXT OUTER LOOP REFERENCING

[75] Inventor: Hiroyasu Nishiyama, Kawasaki, Japan

[73] Assignee: Hitachi, Ltd., Tokyo, Japan

[21] Appl. No.: 09/060,377

[22] Filed: Apr. 15, 1998

[30] Foreign Application Priority Data

Apr. 17, 1997 [JP] Japan ................................. 9-100429

[51] Int. Cl.[7] ........................................... G06F 9/44
[52] U.S. Cl. ................ 717/9; 717/2; 717/8; 711/213; 712/241
[58] Field of Search ..................... 395/702, 708, 395/709; 711/213; 712/241; 717/2, 8, 9

[56] References Cited

U.S. PATENT DOCUMENTS

| | | | |
|---|---|---|---|
| 5,357,618 | 10/1994 | Mirza et al. | 711/3 |
| 5,704,053 | 12/1997 | Santhanam | 712/207 |
| 5,752,037 | 5/1998 | Gornish et al. | 717/9 |
| 5,854,934 | 12/1998 | Hsu et al. | 717/9 |

*Primary Examiner*—Kenneth S. Kim
*Attorney, Agent, or Firm*—Antonelli, Terry, Stout & Kraus, LLP

[57] ABSTRACT

A nested-loop data prefetching method in which a program is converted so that prefetching is performed effectively even in nested loops in which the loop length of the innermost loops is short and the loop length of the outer loops is long. In this method, first a prefetch target loop is selected from the innermost loops in the nested loops. The selected loop is then split into a front half loop and a rear half loop by application of index set splitting. Further, an instruction to prefetch data used by the selected loop per se is inserted into the front half loop whereas an instruction to prefetch data used in the next prefetch target loop is inserted into the rear half loop.

4 Claims, 11 Drawing Sheets

FIG.3A

```
DO J=1,M
  DO I=1,N
    V[J][I] = W[J][I]       } 301
  END DO
  DO I=1,N
    X[J][I] = Y[J][I]       } 302
  END DO
END DO
```

FIG.3B

```
DO I=1,α
  PREFETCH V[1][I]
  PREFETCH W[1][I]          } 303
END DO
DO J=1,M
  IF N>α THEN
    DO I=1,N-α
      PREFETCH V[J][I+α]
      PREFETCH W[J][I+α]    } 304
      V[J][I] = W[J][I]
    END DO
    DO I=N-α+1,N
      PREFETCH X[J][I-N+α]
      PREFETCH Y[J][I-N+α]  } 305
      V[J][I] = W[J][I]
    END DO
  ELSE
    DO I=1,N
      PREFETCH X[J][I-N+α]
      PREFETCH Y[J][I-N+α]  } 306
      V[J][I] = W[J][I]
    END DO
  END IF
  IF N>α THEN
    DO I=1,N-α
      PREFETCH X[J][I+α]
      PREFETCH Y[J][I+α]    } 307
      X[J][I] = Y[J][I]
    END DO
    DO I=N-α+1,N
      PREFETCH V[J+1][I-N+α]
      PREFETCH W[J+1][I-N+α] } 308
      X[J][I] = Y[J][I]
    END DO
  ELSE
    DO I=1,N
      PREFETCH V[J+1][I-N+α]
      PREFETCH W[J+1][I-N+α] } 309
      X[J][I] = Y[J][I]
    END DO
  END IF
END DO
```

FIG.4A

```
DO J=1,M
  DO I=1,N
    X[J][I] = Y[J][I]     }401
  END DO
END DO
```

FIG.4B

```
DO I=1,α
  PREFETCH X[1][I]
  PREFETCH Y[1][I]         }402
END DO
DO J=1,M
  IF N>α  THEN
    DO I=1,N-α
      PREFETCH X[J][I+α]
      PREFETCH Y[J][I+α]   }403
      X[J][I] = Y[J][I]
    END DO
    DO I=N-α+1,N
      PREFETCH X[J+1][I-N+α]
      PREFETCH Y[J+1][I-N+α] }404
      X[J][I] = Y[J][I]
    END DO
  ELSE
    DO I=1,N
      PREFETCH X[J+1][I]
      PREFETCH Y[J+1][I]   }405
      X[J][I] = Y[J][I]
    END DO
  END IF
END DO
``` prefetch GRn, PFRn move_to_pfr PFRn, GRn move_from_pfr GRn, PFRn

```
DO J=1,M
   DO I=1,N
      X[J][I] = Y[J][I]       } 201
   END DO
END DO
```

```
DO J=1,M
   DO I=1,N
      PREFETCH X[J][I+α]
      PREFETCH Y[J][I+α]      } 202
      X[J][I] = Y[J][I]
   END DO
END DO
```

```
DO J=1,M
   DO I=1,α
      PREFETCH X[J][I]
      PREFETCH Y[J][I]        } 203
   END DO
   DO I=1,N-α
      PREFETCH X[J][I+α]
      PREFETCH Y[J][I+α]      } 204
      X[J][I] = Y[J][I]
   END DO
   DO I=N-α+1,N
      X[J][I] = Y[J][I]       } 205
   END DO
END DO
```

NESTED LOOP DATA PREFETCHING USING INNER LOOP SPLITTING AND NEXT OUTER LOOP REFERENCING

BACKGROUND OF THE INVENTION

The present invention relates to a nested-loop data prefetching method, a processor and a program generating method. More particularly, the invention relates to a nested-loop prefetching method, a processor and a program generating method for nested loops in which the wait time caused by reference to a main memory can be reduced sufficiently even in nested loops in which the loop length of the innermost loops is short and the loop length of the outer loops is long.

In a computer, a cache memory having a higher speed than a main memory is disposed between a processor and the main memory so that recently referred data is placed on the cache memory to reduce the wait time caused by reference to the main memory.

In calculation using a large quantity of data, for example, such as numerical calculation, etc., however, cache miss occurs frequently because locality of reference to data is low. Accordingly, there arises a problem that the wait time caused by reference to the main memory cannot be reduced sufficiently.

To cope with such cache miss in such a large quantity of data, there has been proposed a prefetching method in which prefetch instructions for moving data from the main memory to the cache memory before use of the data is provided in the processor so that the prefetch instructions are inserted into a program by a compiler, as described in the paper, by T. C. Mowry et al, "Design and Evaluation of a Compiler Algorithm for Prefetching", Proceedings of the 5th International Conference on Architectural Support for Programming Languages and Operating Systems, pp.62–73, 1992.

Specifically, with respect to a loop 201 shown in FIG. 13A, an offset $\alpha$ between elements required for prefetching data is calculated on the basis of the number of cycles required for prefetching data from the main memory to the cache memory and the number of cycles in predicted execution of the loop. As represented by a loop 202 shown in FIG. 13B, prefetch instructions "PREFETCH" are first inserted so that data are prefetched by a loop precedent by the offset $\alpha$ to a loop using the data. However, data used in repetition by 1 to $\alpha$ times are not prefetched when nothing but the aforementioned countermeasure is done ($\alpha$ is a positive integer).

Further, in the last repetition by (N−$\alpha$+1) to N times, only data not used in any arithmetic operation are prefetched (N is a positive integer indicating the number of repetitions for the innermost loop (loop length)).

Therefore, as shown in FIG. 13C, an $\alpha$-times loop 203 for prefetching data used in repetition by 1 to $\alpha$ times is inserted before the start of the innermost loop. Further, the original loop 201 is split into a front half loop 204 for executing repetition by 1 to (N−$\alpha$) times and a rear half loop 205 for executing the residual repetition by application of index set splitting so that no prefetch instruction is inserted into the rear half loop 205.

In the aforementioned prefetching method, cache miss is reduced so that the wait time caused by reference to the main memory can be reduced.

Incidentally, the essence of prefetching is in the loop 204 of FIG. 13C in which a movement of data from the main memory to the cache memory and an arithmetic operation are performed so as to overlap each other. If the value of the offset $\alpha$ is relatively large compared with the loop length N of the innermost loop, the percentage of the essential loop 204 becomes small and the percentage of the inessential loops 203 and 205 becomes large. Accordingly, there arises a problem that the wait time caused by reference to the main memory cannot be reduced sufficiently on a whole.

That is, conventionally, there was a problem that the wait time caused by reference to the main memory could not be reduced sufficiently in nested loops in which the loop length of the innermost loop was short and the loop length of the outer loops was long because only the innermost loop was a subject of application of the prefetching method.

FIG. 14 is a typical view showing a state of prefetching in the case where prefetching is performed by the conventional method using the innermost loop as a subject. Here, the loop length is N. In execution of the innermost loop, data to be referred to in the (1+$\alpha$)-th repetition is prefetched in the first loop repetition (1401). Similarly, data to be referred to in the (N+$\alpha$)-th repetition is prefetched in the N-th loop repetition. Prefetching for the (N+1)-th to (N+$\alpha$)-th repetitions is, however, wasteful because the number of repetitions for the loop is N. Further, prefetching is not performed in the first to $\alpha$-th repetitions.

SUMMARY OF THE INVENTION

Therefore, an object of the present invention is to provide a nested-loop data prefetching method, a micro-processor and a program generating method in which the wait time caused by reference to a main memory can be reduced sufficiently even in nested loops in which the loop length of the innermost loops is short and the loop length of the outer loops is long.

According to an aspect of the present invention, prefetch instructions are inserted by the following procedures.
(Procedure 1)
Loops LOOP0, . . . , LOOPm−1 to which prefetching is to be applied are selected from the innermost loops in the nested loops by considering user's designation of directive or option, or analyzing data reuse of loops automatically as described in the aforementioned paper.
(Procedure 2)
When Length(i) is the number of times by which a loop LOOPi ($0 \leq i \leq m-1$) is repeated, Cycle(MEM) is the number of cycles required for transferring data from the main memory to the cache memory, and Cycle(i) is the number of cycles predicted for executing the loop LOOPi once, the number $\beta$ of split repetitions is given by $\beta$=Cycle(MEM)/Cycle(i) (in which $\beta$ is a positive integer).

Then, index set splitting is applied to the loop LOOPi so that the loop LOOPi is split into a front half loop LOOPi.0 for executing the first to (Length(i)-th $\beta$)-th repetitions and a rear half loop LOOPi.1 for executing the residual, (Length (i)-$\beta$+1)-th to Length(i)-th repetitions.
(Procedure 3)
Prefetch instructions "PREFETCH X(j+Step(i)*$\beta$)" are inserted for memory reference "X(j)" in which cache missing occurs in the front half loop LOOPi.0. Here, Step(i) is the incremental value of the loop index of LOOPi.

Further, when k is the loop index of the rear half loop LOOPi.1 and has an initial value Init(i.1), prefetch instructions "PREFETCH Y[Start(Y)+(k-Init(i.1)*(Step(LOOP (((i+1) mod m)))/Step(i))]" are inserted for memory reference "Y[j]" in which cache missing occurs in a prefetch target loop LOOP((i+1) mod m) next to the loop LOOPi. Here, Start(Y) is the initial reference index thereof.

Incidentally, if $((i+1) \bmod m)=0$, an address corresponding to the outer loop index put forward by once is used as a prefetch target address.

Incidentally, (A mod B) indicates a remainder obtained by dividing A by B.

According to another aspect of the present invention, provided is a nested-loop data prefetching method comprising the steps of:

obtaining the number of split repetition of at least two innermost loops having fraternal relationship in nested loops on the basis of the number of cycles required for prefetching data from a main memory to a cache memory and the number of cycles for predicted execution of the innermost loops; splitting one of the innermost loops into a front half portion to be repeated by the number of times based on the number of split repetitions and a rear half portion to be repeated by the residual number of repetitions; and inserting a prefetch instruction into the front half portion to prefetch data used by the one innermost loop per se and inserting another prefetch instruction into the rear half portion to prefetch data used by the other of the fraternal innermost loops to be executed next.

The aforementioned nested-loop data prefetching method corresponds to the case of $((i+1) \bmod m) \neq 0$ in the procedure 3. Also in the rear half loop, a movement of data (which will be used in the paternal innermost loops to be executed next) from the main memory to the cache memory and an arithmetic operation are performed so as to overlap each other. Accordingly, by the essential function of prefetching, the wait time caused by reference to the main memory can be reduced sufficiently even in nested loops in which the loop lengths of the innermost loops is short and the loop length of outer loops is long.

FIG. 15 typically shows a state of prefetching for nested loops containing two fraternal innermost loops. Each of the innermost loops constituting nested loops is split into a front half loop 1501 and a rear half loop 1502. In the front half loop, data used by the loop per se are prefetched (1503). In the rear half loop of the first loop in the two innermost loops, data to be referred to in the beginning of the second loop are prefetched (1504). In the rear half loop of the second innermost loop, data to be referred to in the beginning of the first loop in the next outer loop repetition are prefetched (1505).

According to a further aspect of the present invention, provided is a nested-loop data prefetching method comprising the steps of: obtaining the number of split repetitions on the basis of the number of cycles required for prefetching data from a main memory to a cache memory and the number of cycles for predicted execution of the innermost loop in tightly nested loops; splitting the innermost loop into a front half portion to be repeated by the number of times based on the number of split repetitions and a rear half portion to be repeated by the residual number of repetitions; and inserting a prefetch instruction into the front half portion to prefetch data used by the innermost loop per se and inserting another prefetch instruction into the rear half portion to prefetch data used by the innermost loop in repetition of the next outer loop.

The tightly nested-loop data prefetching method corresponds to the case of $((i+1) \bmod m)=0$ in the procedure 3. Also in the rear half loop, a movement of data (which will be used in the innermost loop in the next outer loop repetition) from the main memory to the cache memory and an arithmetic operation are performed so as to overlap each other. Accordingly, by the essential function of prefetching, the wait time caused by reference to the main memory can be reduced sufficiently even in nested loops in which the loop lengths of the innermost loops is short and the loop length of outer loops is long.

FIG. 16 typically shows a state of prefetching for tightly nested loops. The innermost loop constituting tightly nested loops is split into a front half loop 1601 and a rear half loop 1602. In the front half loop, data used by the loop per se are prefetched (1603). In the rear half loop, data to be referred to in the beginning of the next outer loop repetition are prefetched (1604).

According to a still further aspect of the present invention, provided is a processor with prefetch instructions, comprising prefetch-purpose extended registers which are provided separately from general-purpose registers so that the prefetch-purpose extended registers can be designated as operands, such as base, offset, etc., of prefetch instructions.

In prefetching, registers are used for generating the offset of prefetching and the prefetch target address. Accordingly, in a program using a large number of general-purpose registers, shortage of registers occurs. Accordingly, there is a risk of lowering of performance because of spilling to memory. Therefore, the aforementioned processor is provided with prefetch-purpose extended registers, by which the shortage of registers can be prevented when the fraternal-loop or tightly nested-loop data prefetching method is carried out.

Incidentally, in the aforementioned prefetch-purpose extended registers, the number of cycles required for reference thereto is always constant though the number of cycles required for memory reference is not always constant. Accordingly, the prefetch-purpose extended registers can be used not only for prefetching but also for temporarily storing data at the time of shortage of general-purpose registers.

According to another aspect of the present invention, in the above processor, the processor has a prefetch instruction in which, in order to calculate a prefetch target address, the value of a prefetch-purpose extended register designated by an operand is used as base or offset for calculating the prefetch target address in combination with the value of a general-purpose register designated by another operand.

The aforementioned processor is provided with prefetch-purpose extended registers used for calculating prefetch target addresses and prefetch instructions for designating general-purpose registers by operands. Accordingly, the fraternal-loop or tightly nested-loop data prefetching method can be carried out effectively.

According to a further aspect of the present invention, in the above processor, the processor has a data transfer instruction for performing data transfer between a prefetch-purpose register and either a general-purpose register or a main memory.

In this processor, setting values to the prefetch-purpose extended registers and taking the values from the prefetch-purpose extended registers can be executed by the data transfer instructions. Accordingly, the fraternal-loop or tightly nested-loop data prefetching method can be carried out effectively.

According to a still further aspect of the present invention, provided is a program generating method comprising the steps of: analyzing a given input program; and inserting prefetch instructions into the input program to generate an output program by application of the aforementioned fraternal-loop or tightly nested-loop data prefetching method.

If a recording medium in which a compiler program for making a computer carry out this program generating method is recorded is read by the computer to make the computer execute application of the fraternal-loop or tightly nested-loop data prefetching method to an input program, an output program high in executing efficiency can be obtained.

BRIEF DESCRIPTION OF THE DRAWINGS

FIG. 3A is a view showing a program of nested loops containing a plurality of innermost loops having the relationship of fraternal loops;

FIG. 3B is a view showing a program after application of a prefetching method of the present invention to the program of nested loops depicted in FIG. 3A;

FIG. 4A is a view showing a program of tightly nested loops;

FIG. 4B is a view showing a program after application of a prefetching method according to an embodiment of the invention to the program of tightly nested loops depicted in FIG. 4A;

DESCRIPTION OF THE PREFERRED EMBODIMENTS

Embodiments of the present invention will be described below with reference to the drawings but the present invention is not limited thereto.

Figure 1:
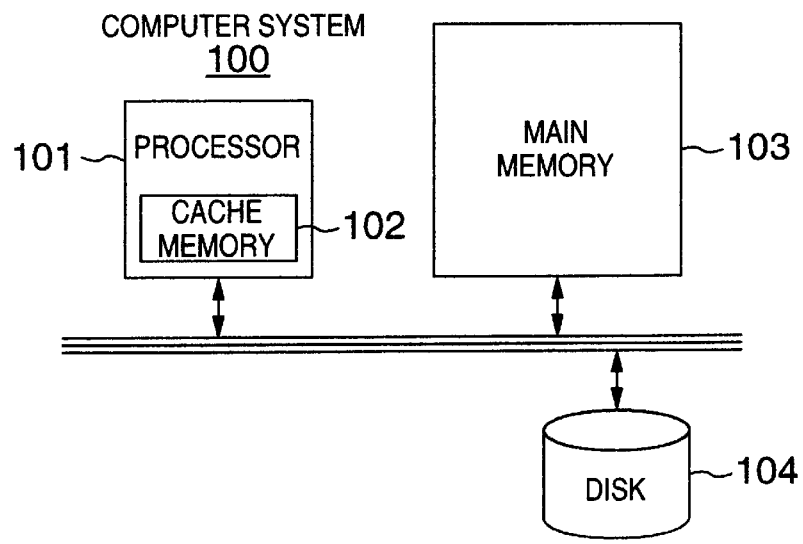
FIG. 1 is a configuration diagram of a computer system for carrying out a nested-loop data prefetching method according to an embodiment of the present invention.

FIG. 1 shows an example of a computer system for carrying out the present invention.

This computer system 100 comprises a micro-processor 101, a cache memory 102 contained in the micro-processor 101, a main memory 103, and a disk device 104. A compiler program read from a recording medium is stored in the magnetic disk device 104.

The micro-processor 101 reads the compiler program stored in the disk device 104, compiles a given source program and outputs an object program as a result of compiling.

In the case of execution of an ordinary memory reference instruction, the micro-processor 101 checks whether reference target data is present in the cache memory 102 or not. If the data is present in the cache memory 102, the data is referred to. If there is no reference target data in the cache memory 102, a cache block containing the data is copied to the cache memory 102 with reference to the data on the main memory 103. If an instruction to prefetch the reference target data has been issued before the number of cycles sufficient to move the cache block from the main memory 103 to the cache memory 102, the reference target data is always present in the cache memory 102. Accordingly, the wait time for referring to the data on the main storage 103 is eliminated so that program executing performance is improved.

Figure 2A:
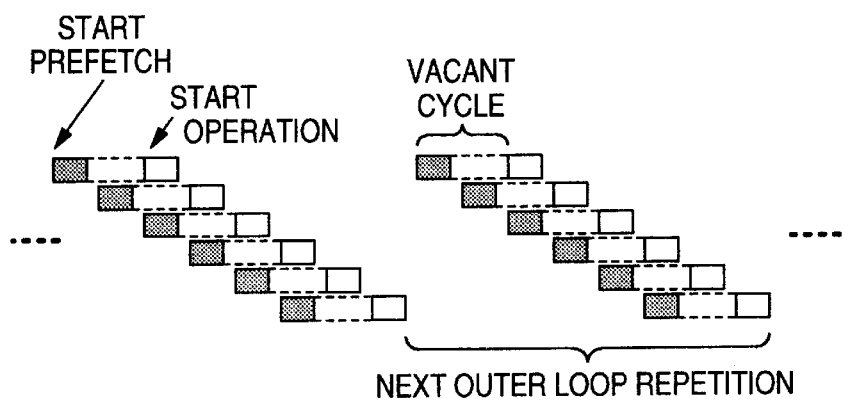
FIG. 2A is a view for explaining a conventional prefetching method.
Figure 2B:
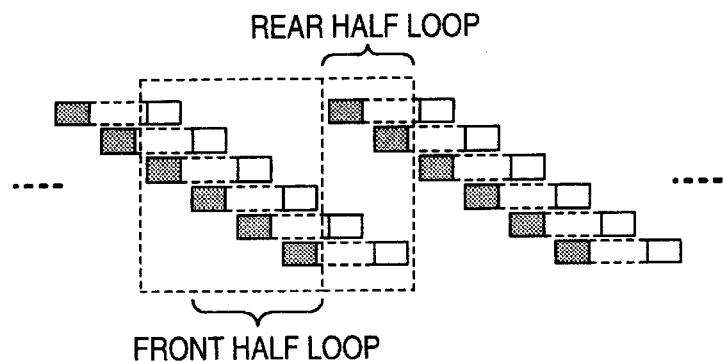
FIG. 2B is a view for explaining a nested-loop data prefetching method according to an embodiment of the present invention.

FIG. 2A is a view for explaining a conventional prefetching method whereas FIG. 2B is a view for explaining a nested-loop prefetching method according to the present invention. This will be described later in detail.

FIGS. 3A and 3B are views for explaining a result of the case where the nested-loop prefetching method according to the present invention is applied to nested loops containing two innermost loops 301 and 302 having the relationship of twin loops. This will be described later in detail.

FIGS. 4A and 4B are views for explaining a result of the case where the nested-loop prefetching method according to the present invention is applied to tightly nested loops. This will be described later in detail.

Figure 5:
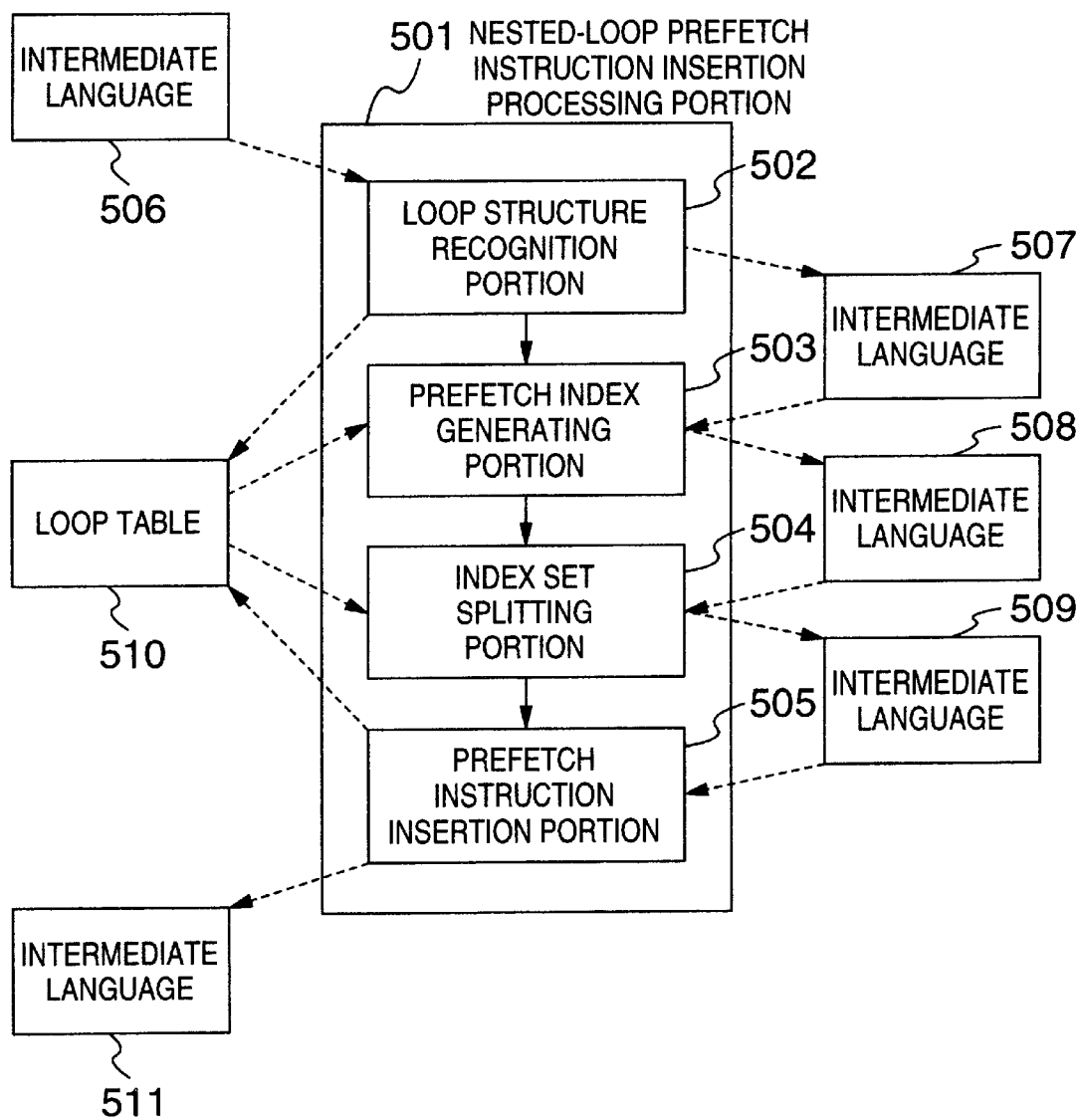
FIG. 5 is a diagram showing an example of configuration of a nested-loop prefetch instruction insertion processing portion which is an important part of a compiler program according to an embodiment of the present invention.

FIG. 5 is a configuration diagram of a nested-loop prefetch instruction insertion processing portion 501 which is an important part of the compiler program. In FIG. 5, the solid-line arrows show a flow of control, and the broken-like arrows show a flow of data.

The nested-loop prefetch instruction insertion processing portion 501 is an important part for carrying out the nested-loop prefetching method according to the present invention. The portion 501 receives, as an input, an intermediate language 506 which is converted from the source program. The portion 501 sends out, as an output, an intermediate language 511 which is converted from the intermediate language 506 so as to carry out nest-loop prefetching.

The nested-loop prefetch instruction insertion processing portion 501 has a loop structure recognition portion 502, a prefetch index generation portion 503, an index set splitting portion 504, and a prefetch instruction insertion portion 505. The intermediate languages 507 to 509 are generated in processes respectively. A loop table 510 is rewritten whenever one of the intermediate languages is generated.

Figure 6:
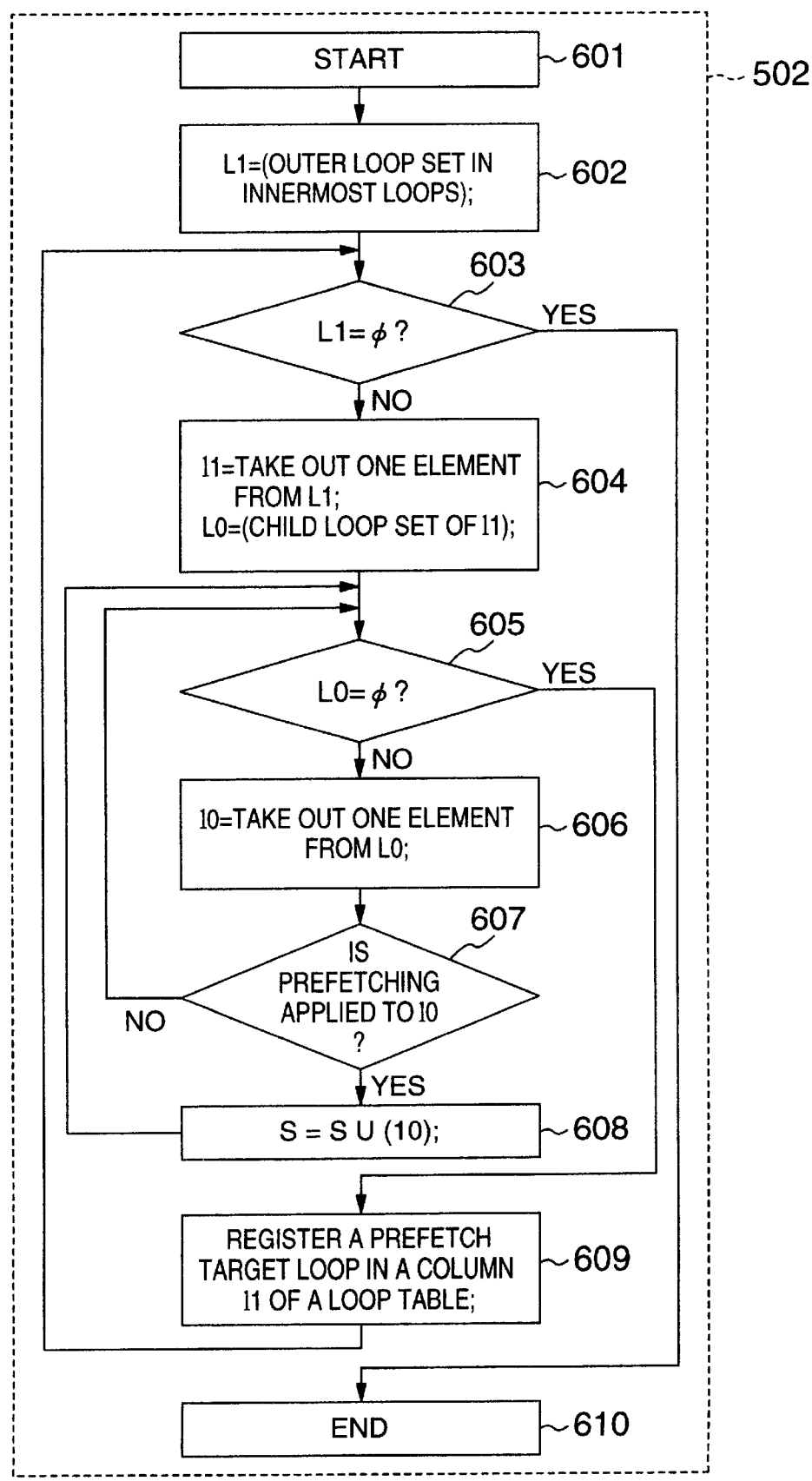
FIG. 6 is a flow chart showing the processing operation of the loop structure recognition portion in the configuration depicted in FIG. 5.

FIG. 6 is a flow chart showing the processing operation of the loop structure recognition portion 502.

In step 601, the processing is started.

In step 602, a loop set outside the innermost loop is obtained as L1. For example, the loop set is obtained by application of a known control flow analyzing technique as described in the book, by Aho et al, "Compilers—Principles, Techniques, and Tools", Addison-Wesley, 1986.

In step 603, checking is made as to whether the obtained loop set L1 is an empty set or not. If L1 is an empty set, controlling goes to step 610 to terminate the processing. On the contrary, if L1 is not an empty set, controlling goes to step 604.

In the step 604, one element is taken out from L1 and stored in l1. A child loop set of l1 is stored in L0. Further, a set S for obtaining a prefetch target loop of L1 is initialized to an empty set.

In step 605, checking is made as to whether the child loop set L0 of l1 is an empty set or not. If L0 is a null set, controlling goes to step 609, while it is not an empty set, controlling goes to step 606.

In step 606, one element is taken out from the child loop set L0 and the loop is replaced by l0.

In step 607, checking is made as to whether prefetching is applied to the loop l0 or not. This checking may be made in accordance with designation by an option or directive from a user or in accordance with a known technique described in the above-mentioned paper written by T. C. Mowry et al. If prefetching is applied to the loop l0, controlling goes to step 608. If prefetching is not applied to the loop l0, controlling goes back to the step 605 to process the next innermost loop.

In step 608, the loop l0 is added, as a prefetch target loop, to the set S and controlling goes back to the step 605 to process the next innermost loop.

In step 609, the prefetch target loop set S is registered in a column of a loop table l1 and controlling goes back to the step 603 to process the next nested loops.

Figure 7:
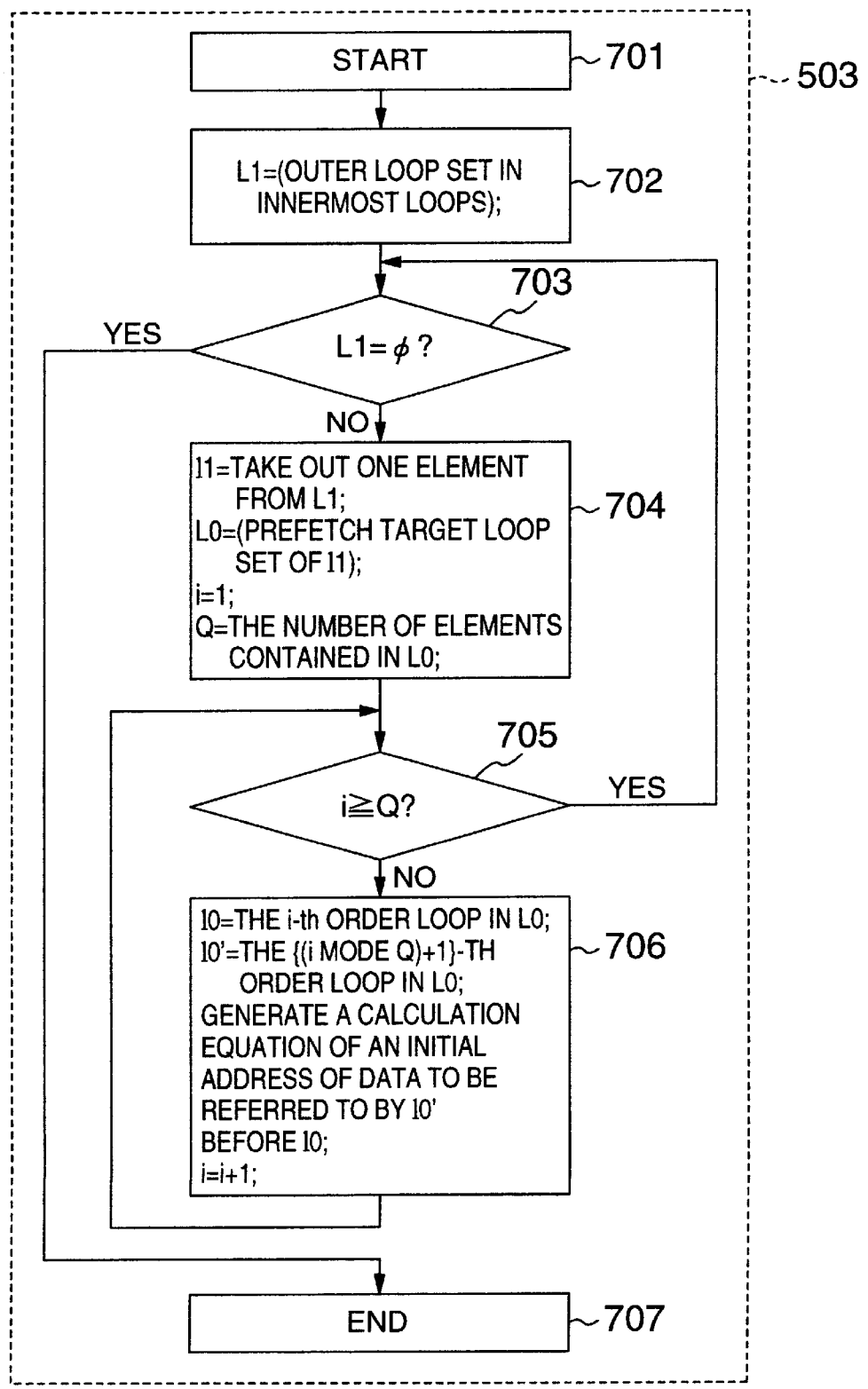
FIG. 7 is a flow chart showing the processing operation of the prefetch index generating portion depicted in FIG. 5.

FIG. 7 is a flow chart showing the processing operation of the prefetch index generation portion 503.

In step 701, the processing is started.

In step 702, a loop set outside the innermost loop is obtained as a set L1.

In step 703, checking is made as to whether the obtained loop set L1 is an empty set or not. If L1 is an empty set, controlling goes to step 707 to terminate the processing. If L1 is not an empty set, controlling goes to step 704.

In the step 704, one element is taken out from L1 and stored in l1. Further, the prefetch target loop set l1 obtained by the loop structure recognition portion 502 is stored in l0. Further, a variable i is initialized to "1". Further, a variable Q is initialized to the number of elements contained in l0.

In step 705, checking is made as to whether the variable i is smaller than Q or not. If the variable i is not smaller than Q, controlling goes back to the step 703 to process the next nested loops. If the variable i is smaller than Q, controlling goes to step 706.

In the step 706, the i-th order loop in L1 is stored in l0. Further, the ((i mod Q) +1)-th order loop in L0 is stored in l0'. Here, (i mod Q) shows a remainder when i is divided by Q. Further, an equation for calculating the initial address of data to be referred to in l0' is generated before l0. Further, the value of i is increased by "1" and controlling goes back to the step 705 to process the next innermost loop.

Figure 8:
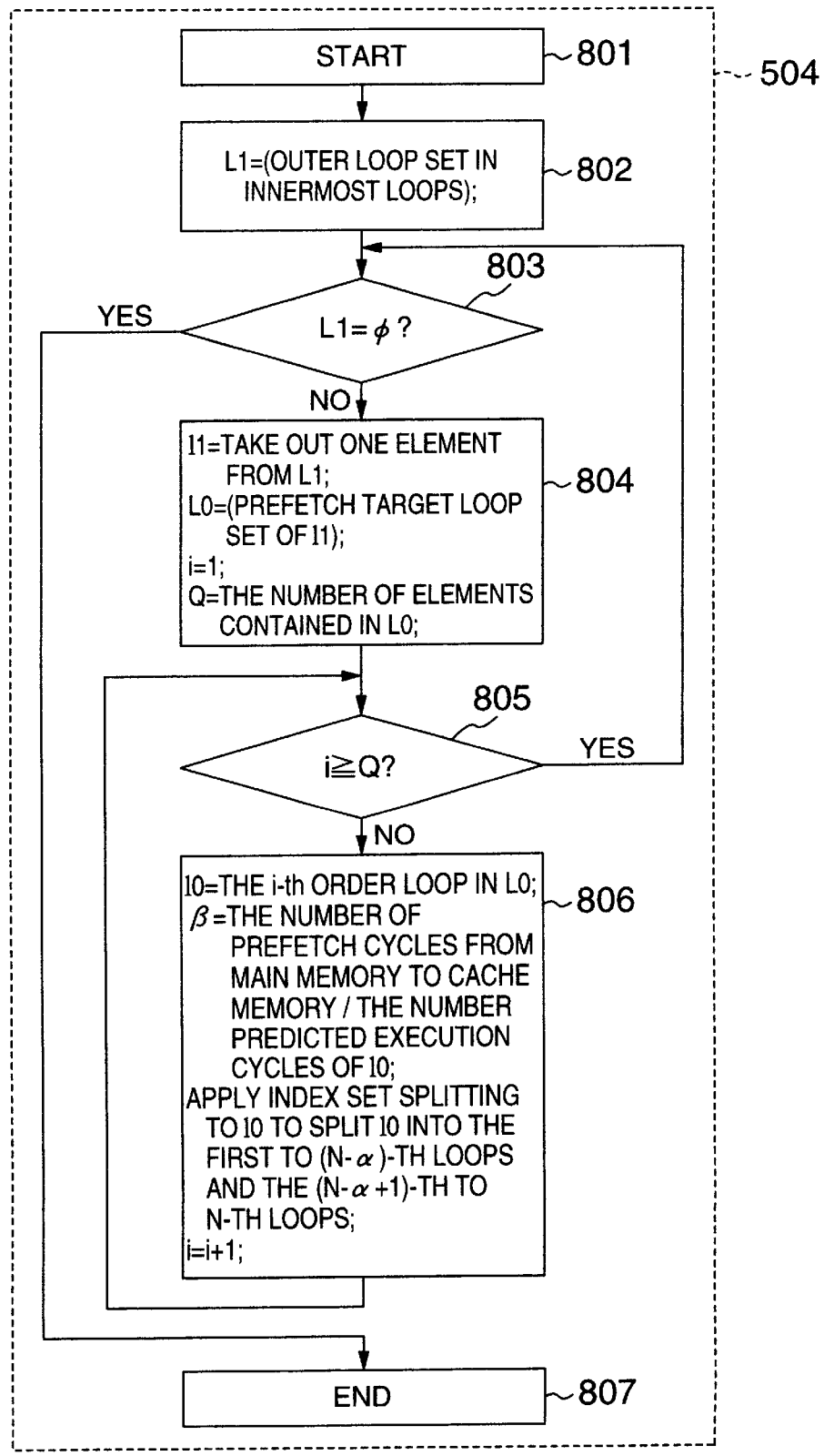
FIG. 8 is a flow chart showing the processing operation of the index set splitting portion depicted in FIG. 5.

FIG. 8 is a flow chart showing the processing operation of the index set splitting portion 504.

In step 801, the processing is started.

In step 802, a loop set outside the innermost loop is obtained as a set L1.

In step 803, checking is made as to whether the obtained loop set L1 is an empty set or not. If L1 is an empty set, controlling goes to step 807 to terminate the processing. If L1 is not an empty set, controlling goes to step 804.

In the step 804, one element is taken out from L1 and stored in l1. Further, the prefetch target loop set l1 obtained by the loop structure recognition portion 502 is stored in l0. Further, the variable i is initialized to "1". Further, the variable Q is initialized to the number of elements contained in l0.

In step 805, checking is made as to whether the variable i is not smaller than Q or not. If the variable i is not smaller than Q, controlling goes to the step 803 to process the next nested loops. If the variable i is smaller than Q, controlling goes to step 806.

In step 806, the i-th order loop in L0 is stored in l0. Further, a value obtained when the number of cycles required for prefetching from the main memory 103 to the cache memory 102 is divided by the number of predicted execution cycles per loop l0, that is, the number of repetitions to split is stored in $\beta$. Further, index set splitting is applied to the loop l0 so that the loop is split into loops to be repeated by 1 to (N–$\beta$) times and loops to be repeated by (N–$\beta$+1) to N times. For example, a known loop optimizing technique described in the paper by M. Wolfe, "High Performance Compilers For Parallel Computing", Addison-Wesley, 1996 may be applied to the index set splitting. Further, the value of i is increased by "1" and controlling goes to the step 805 to process the next innermost loop.

Figure 9:
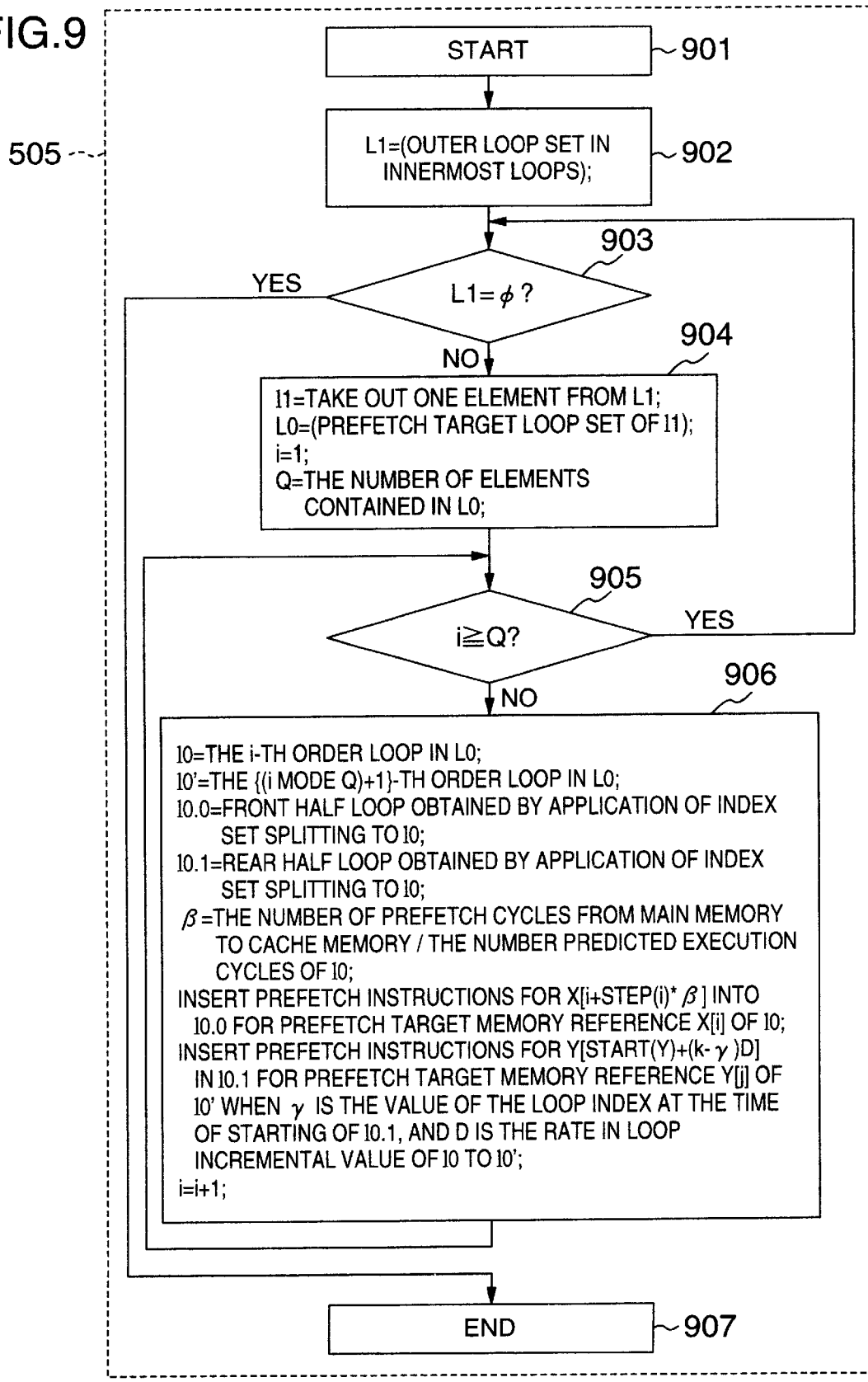
FIG. 9 is a flow chart showing the processing operation of the prefetch instruction insertion portion depicted in FIG. 5.

FIG. 9 is a flow chart showing the processing operation of the prefetch instruction insertion portion 505.

In step 901, the processing is started.

In step 902, a loop set outside the innermost loop is obtained as a set L1.

In step 903, checking is made as to whether the obtained loop set L1 is an empty set or not. If L1 is an empty set, controlling goes to step 907 to terminate the processing. If L1 is not an empty set, controlling goes to step 904.

In the step 904, one element is taken out from L1 and stored in l1. Further, the prefetch target loop set l1 obtained by the loop structure recognition portion 502 is stored in l0. Further, the variable i is initialized to "1". Further, the variable Q is initialized to the number of elements contained in l0.

In step 905, checking is made as to whether the variable i is smaller than Q or not. If the variable i is not smaller than Q, controlling goes back to the step 903 to process the next nested loops. If the variable i is smaller than Q, controlling foes to step 906.

In step 906, the i-th order loop in L0 is stored in l0. Further, the ((i mod Q)+1)-th order loop in L0 is stored in l0'. Further, front half and rear half loops obtained when the index set splitting portion 504 applies index set splitting to l0, are stored in l0.0 and l0.1 respectively. Further, a value obtained when the number of cycles required for prefetching from the main memory 103 to the cache memory 102 is divided by the number of predicted execution cycles per loop l0, that is, the number of repetitions to split is stored in $\beta$. Further, for prefetch target memory reference X[i] of the loop l0, a prefetch instruction for X[i+Step(i)*$\beta$] is inserted into the front half loop l0.0 generated by index set splitting. Further, for prefetch target memory reference Y[j] of the loop l0', a prefetch instruction for Y[Start(Y)+(k–$\gamma$)D] is inserted into the rear half loop l0.1 when k is the loop index of l0.1, $\gamma$ is the value of loop index at the time of starting of l0.1 and D is the rate of the loop increment value of the loop l0 to the loop increment value of the loop l0'.

Further, the value of i is increased by "1" and controlling goes to the step 905 to process the next innermost loop.

In the equation for calculating an address for a prefetch instruction, β and γ are invariant values in a loop. Accordingly, when β and γ are moved out of the loop, the number of operands in the loop can be reduced. However, when β and γ are moved out of the loop, there is a risk of shortage of general-purpose registers in a program using a large number of general-purpose registers because general-purpose registers for holding the values of β and γ are required separately. Therefore, if prefetch-purpose extended registers for holding the loop invariant obtained from β and γ are provided in the micro-processor 101 and prefetch instructions using the prefetch-purpose extended registers are generated, the shortage of general-purpose registers can be avoided.

Figures 10, 11, 12, 13A, 13B, 13C, 14:
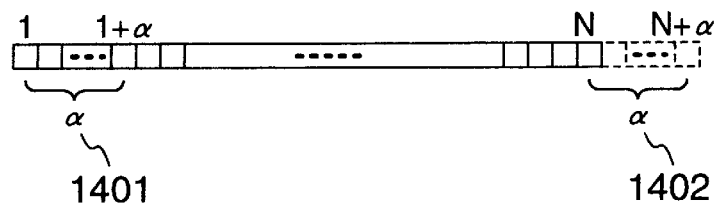
FIG. 10 is an explanatory view showing an example of a prefetch instruction.
FIG. 11 is an explanatory view showing an example of an instruction to transfer data to a prefetch-purpose extended register.
FIG. 12 is an explanatory view showing an instruction to transfer data from a prefetch-purpose extended register.
FIG. 13A is a view showing an example of a conventional loop-containing program.
FIG. 13B is a view showing an example of a program after prefetch instructions are inserted into the conventional program depicted in FIG. 13A.
FIG. 13C is a view of an example of a program showing loops in the case where prefetching is performed for all elements of the program depicted in FIG. 13B.
FIG. 14 is a configuration diagram showing prefetching for the innermost loop in the conventional method.
Figure 15:
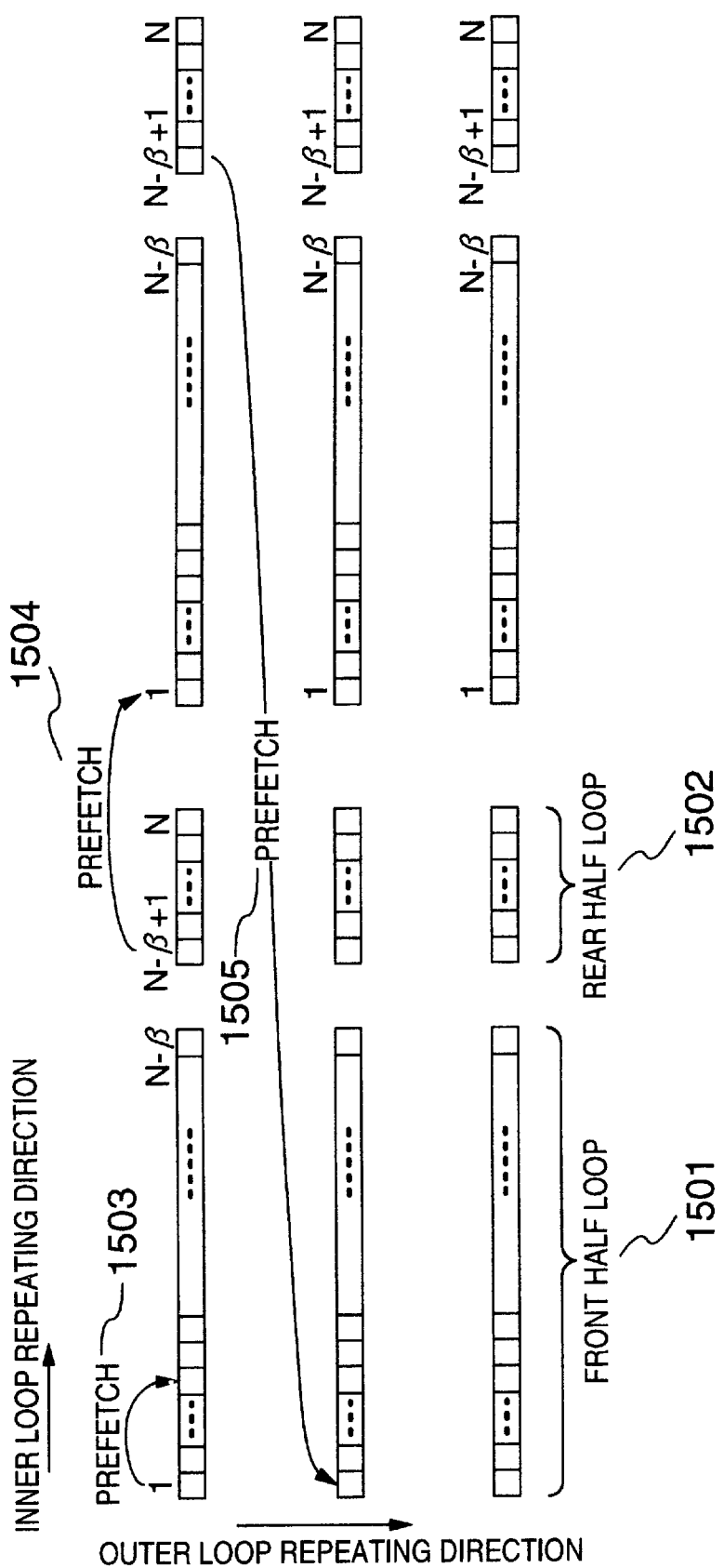
FIG. 15 is a configuration diagram showing prefetching for nested loops according to an embodiment of the present invention.
Figure 16:
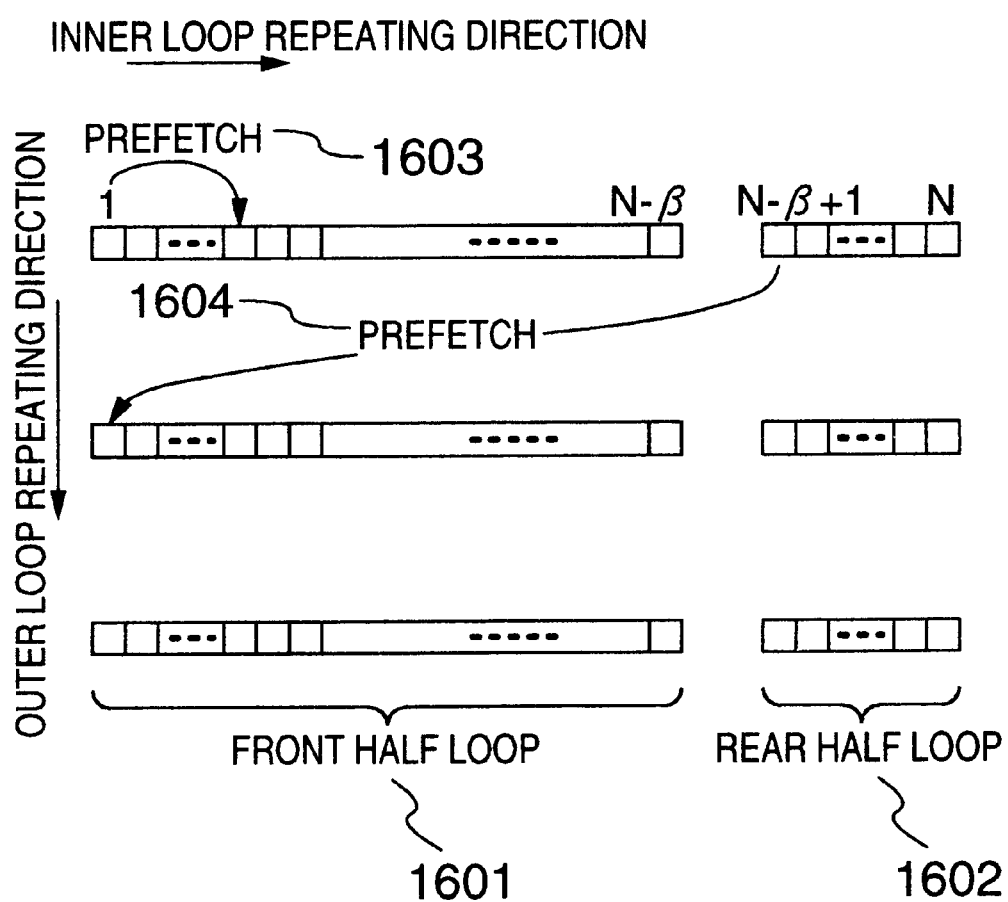
FIG. 16 is a configuration diagram showing prefetching for tightly nested loops according to an embodiment of the present invention.

FIG. 10 shows an example of a prefetch instruction using a prefetch-purpose extended register.

GRn represents a general-purpose register whereas PFRn represents a prefetch-purpose extended register. When this prefetch instruction is used to designate a prefetch-purpose extended register PFRn for an offset invariant in execution of loops and designate a general-purpose register GRn for an offset variant in execution of loops, a prefetching program can be generated without increase of the number of general-purpose registers required for execution of the program.

FIG. 11 shows an example of an instruction for setting a value stored in a general-purpose register GRn to a prefetch-purpose extended register PFRn.

FIG. 12 shows an example of an instruction for copying a value stored in a prefetch-purpose extended register PFRn to a general-purpose register GRn.

An example of application of the prefetching method according to the present invention will be described below.

FIGS. 3A and 3B show an example in which the prefetching method according to the present invention is applied to nested loops containing two innermost loops 301 and 302 having the relationship of fraternal loops.

FIG. 3A shows a program before insertion of prefetch instructions whereas FIG. 3B shows a program after insertion of prefetch instructions.

The program shown in FIG. 3B is obtained from the program shown in FIG. 3A by the following steps 1 to 5.
Step 1:
  Loops 301 and 302 a reselected as the innermost loops to be prefetched.
Step 2:
  Index set splitting is applied to the innermost loops 301 and 302 to be prefetched.
Step 3:
  A prefetch instruction for the loop 301 is inserted into a front half loop generated by splitting the loop 301. Similarly, a prefetch instruction for the loop 302 is inserted into a front half loop generated by splitting the loop 302.
Step 4:
  A prefetch instruction for the loop 302 is inserted into a rear half loop generated by splitting the loop 301. Similarly, a prefetch instruction for the loop 301 in the next repetition of the outer loops is inserted into a rear half loop generated by splitting the loop 302.
Step 5:
  Prefetch of data which is referred to by the loop 301 in loop repetition by first α times when outer loops are first repeated, is inserted in a location just before the outer loops.

A loop 303 is a loop for prefetching data which are used in the first to α-th arithmetic operations of the original loop 301 in repetition of the first outer loop. The loop 303 is inserted in the step 5.

A loop 304 is a loop for performing the first to (N−α)-th arithmetic operations of the original loop 301 and, at the same time, prefetching data used in the (α+1)-th to N-th arithmetic operations of the original loop 301. The loop 304 is inserted in the step 3.

A loop 305 is a loop for performing the (N−α+1)-th to N-th arithmetic operations of the original loop 301 and, at the same time, prefetching data used in the initially first to α-th arithmetic operations of the original loop 302. The loop 305 is inserted in the step 4.

A loop 306 is a loop for prefetching the arithmetic operation of the loop 301 and, at the same time, prefetching data used in the loop 302 when the loop length of the original loop 301 is shorter than α. The loop 306 is inserted in the step 4 (in this case, there is no front half loop, that is, there is only an rear half loop).

A loop 307 is a loop for performing the initially first to (N−α)-th arithmetic operations of the original loop 302 and, at the same time, prefetching data used in execution of the (α+1)-th to N-th arithmetic operations. The loop 307 is inserted in the step 3.

A loop 308 is a loop for executing the (N−α+1)-th to N-th arithmetic operations of the original loop 302 and, at the same time, prefetching data used in the first to α-th arithmetic operations of the loop 301 in the next repetition of the outer loop. The loop 308 is inserted in the step 4.

A loop 309 is a loop for prefetching data used in the loop 301 and, at the same time, executing the arithmetic operation of the loop 302 when the loop length of the original loop 302 is shorter than α. The loop 309 is inserted in the step 4 (in this case, there is no front half loop, that is, there is only an rear half loop).

FIGS. 4A and 4B show an example in which the prefetching method according to the present invention is applied to tightly nested loops as a special form of nested loops.

FIG. 4A shows a program before insertion of prefetch instructions whereas FIG. 4B shows a program after insertion of prefetch instructions.

In the case of tightly nested loops, there is only one loop in the innermost side. Accordingly, execution of the innermost loop and prefetching of data used in the innermost loop in repetition of the next outer loop are performed simultaneously.

A loop 402 is a loop for prefetching data used in the initially first to α-th arithmetic operations of the original loop 401 in repetition of the first outer loop.

A loop 403 is a loop for executing the first to (N−α)-th arithmetic operations of the original loop 401 and, at the same time, prefetching data used in the (α+1)-th to N-th arithmetic operations.

A loop 404 is a loop for executing the (N−α+1)-th to N-th arithmetic operations of the original loop 401 and, at the same time, prefetching data used in the initially first to α-th arithmetic operations of the loop 401 in repetition of the next outer loop.

A loop 405 is a loop for executing the arithmetic operation of the loop 401 and, at the same time, prefetching data used in the loop 401 in repetition of the next outer loop when the loop length of the loop 401 is shorter than α.

In the conventional prefetching method, only prefetching is performed but a vacant cycle without any arithmetic operation occurs at the time of starting of the next outer loop as shown in FIG. 2A. As shown in FIG. 2B, on the contrary, in the nested-loop data prefetching method according to the present invention, data to be referred to in repetition of the next outer loop is prefetched in the rear half loop generated by application of index set splitting, so that there is no vacant cycle (except the point of time of starting).

In the nested-loop data prefetching method, processor and program generating method according to the aforementioned embodiments of the present invention, a program can be converted so that prefetching is performed effectively even in nested loops in which the loop length of the innermost loop is short and the loop length of the outer loops is long. Accordingly, the wait time caused by reference to the main memory can be reduced sufficiently, so that execution of a computer program can be quickened.

What is claimed is:

1. A nested-loop data prefetching method comprising the steps of:

selecting a loop from the innermost loops in nested loops;

applying index set splitting to the selected loop into a front-half count loop and a rear-half count loop; and inserting a prefetch instruction into said front-half count loop to prefetch data to be used by said selected loop per se and inserting a prefetch instruction into said rear-half count loop to prefetch data to be used by another selected loop from the innermost loops.

2. A nested-loop data prefetching method comprising the steps of:

obtaining a split loop count of at least two innermost loops having fraternal relationship in nested loops on the basis of the number of cycles required for prefetching data from a main memory to a cache memory and the number of cycles for predicted execution of said innermost loops;

splitting one of said innermost loops into a front half portion to be repeated by the number of times based on the split loop count and a rear half portion to be repeated a residual number of repetitions; and inserting a prefetch instruction into said front half portion to prefetch data used by said one innermost loop per se and inserting another prefetch instruction into said rear half portion to prefetch data used by the other of the fraternal innermost loops to be executed next.

3. A nested-loop data prefetching method comprising the steps of:

obtaining a split loop count on the basis of the number of cycles required for prefetching data from a main memory to a cache memory and the number of cycles for predicted execution of the innermost loop in tightly nested loops;

splitting said innermost loop into a front half portion to be repeated a number of times based on the split loop count and a rear half portion to be repeated a residual number of repetitions; and inserting a prefetch instruction into said front half portion to prefetch data used by said innermost loop per se and inserting another prefetch instruction into said rear half portion to prefetch data used by the innermost loop in repetition of the next outer loop.

4. A program generating method comprising the steps of:

analyzing a given input program; and inserting prefetch instructions into said input program to generate an output program by application of a nested-loop data prefetching method defined in any one of claims 1 to 3.

* * * * *